United States Patent [19]

Mitchell

[11] Patent Number: 4,651,767

[45] Date of Patent: Mar. 24, 1987

[54] CONVEYOR DEWATERING SYSTEM

[76] Inventor: Laymon Mitchell, 307 Poinciana Dr., Homewood, Ala. 35209

[21] Appl. No.: 842,987

[22] Filed: Mar. 24, 1986

[51] Int. Cl.$^4$ .............................................. F04F 10/00
[52] U.S. Cl. .................................... 137/132; 137/135; 137/142; 137/152
[58] Field of Search ............ 137/132, 135, 142, 150.5, 137/152

[56] References Cited

U.S. PATENT DOCUMENTS

| | | | |
|---|---|---|---|
| 2,082,149 | 6/1937 | Cheavens | 137/152 |
| 4,303,092 | 12/1981 | Logan | 137/152 X |
| 4,345,613 | 8/1982 | Mills et al. | 137/152 X |

Primary Examiner—Gerald A. Michalsky
Attorney, Agent, or Firm—C. A. Phillips

[57] ABSTRACT

A conveyor belt dewatering system in which a siphon tube or pipe is vertically moveable on a tubular support whereby selectively its inlet is lowered into a conveyor belt. Counterweights counter the weight of the siphon tube, these weights being positioned in the tubular support. A source of service water is turned on by a float switch sensing water is the conveyor belt, the service water being used to submerge the weights and lessen their effect and at the same time be supplied to the siphon tube to increase its weight, whereby a siphon tube is lowered into the conveyor belt and siphoning from it commenced.

7 Claims, 4 Drawing Figures

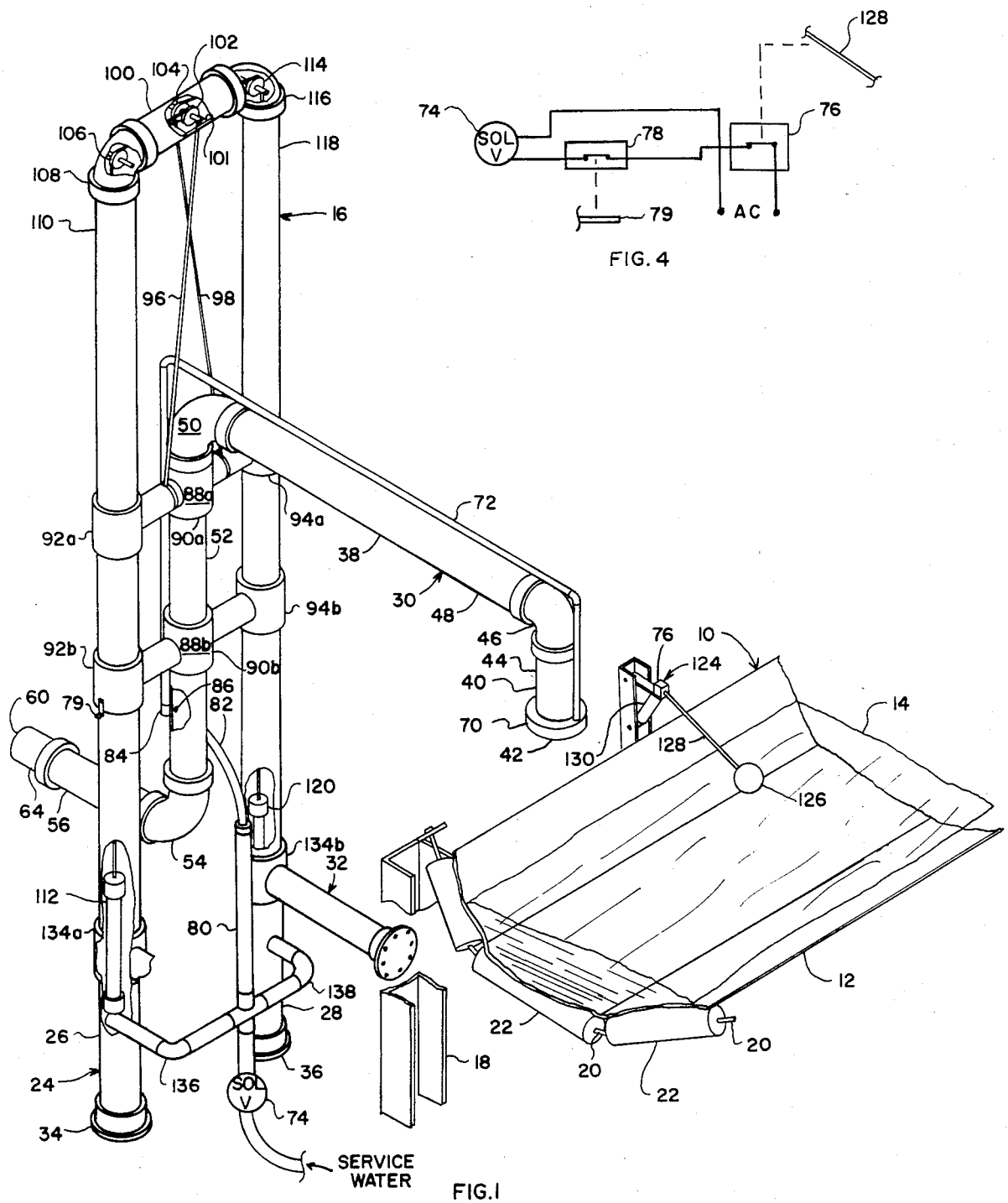

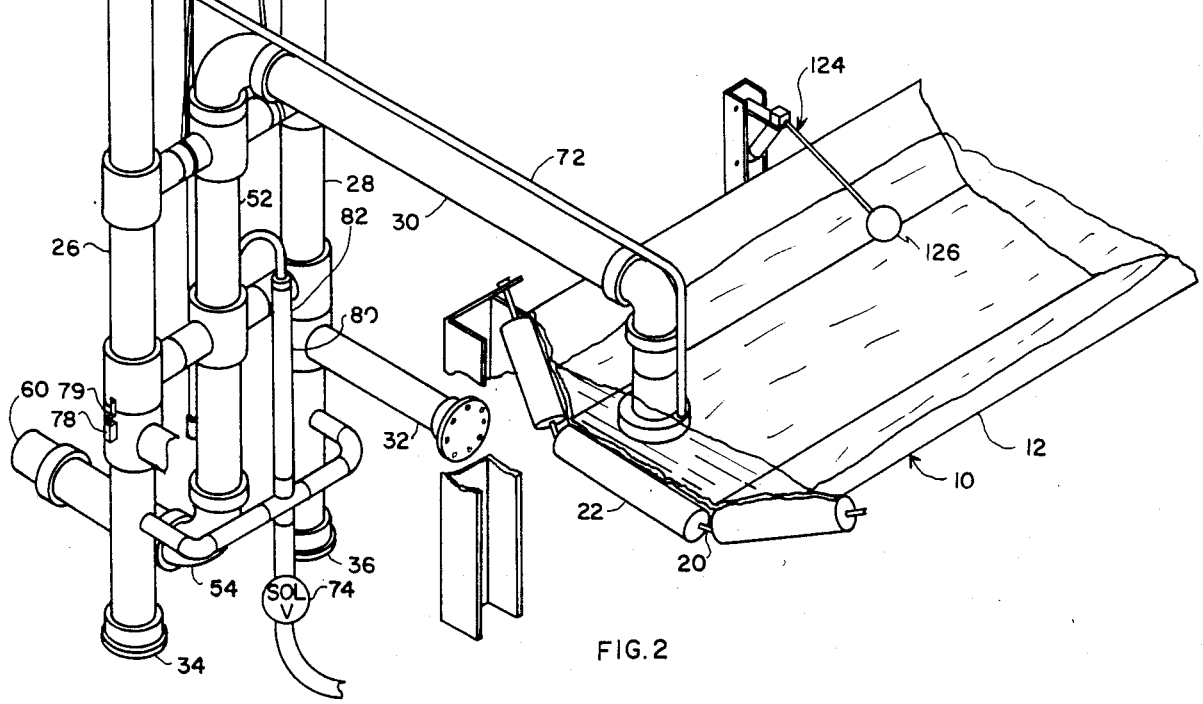

CONVEYOR DEWATERING SYSTEM

BACKGROUND OF THE INVENTION

1. Field of the Invention

This invention relates generally to systems for removing water from outdoor conveyor belts and particularly to a system in which the operable power need only be electrically operated solenoid valves and a pressurized source of liquid.

2. Background of the Invention

It is not uncommon to employ long conveyor belts outdoors, thus being subjected to rain, and not infrequently to be filled or partially filled by such. This produces very substantial weight on the belt and, of course, if the material being conveyed has a density less than water, it tends to float, substantially interfering with the conveyance process. Obviously, one can detect the presence of water and operate a pump or pumps to remove it. One problem with this approach is that often there are a number of positions along the belt which need to be emptied, and the cost of such may be almost prohibitive. A second problem arises from the fact that, typically, electrically powered pumps would be employed, and this means that they either have to be housed or weathering of them produces not infrequent service problems.

It is the object of this invention to provide a simple and inexpensive system which is quite weather tolerant.

SUMMARY OF THE INVENTION

In accordance with this invention, a siphon tube is arranged to be vertically movable so that its inlet may be moved in and out of liquid in a conveyor belt. A sensor senses when liquid has risen to a selected level in the conveyor belt, and means are provided to fill the tube, thereby increasing its weight and causing it to be lowered into the liquid in the conveyor belt. As a result liquid in the conveyor belt is siphoned off. As a further feature of this invention, the siphon tube is supported by counterweights which are within a tubular housing, and the service water is fed into this housing and thus reducing the effective weight of the counterweights and thereby aiding the process effecting downward movement of the siphon tube.

BRIEF DESCRIPTION OF THE DRAWINGS

FIG. 1 is a pictorial view, partially broken away, of the siphon assembly illustrating the siphon tube in a raised postion.

FIG. 2 is a pictorial view, partially broken away, of the siphon assembly illustrating the siphon tube in a lowered position.

FIG. 3 is a broken away view of a portion of the siphon tube illustrating the pressure responsive valve and discharge outlet.

FIG. 4 is an electrical diagram of control circuitry for the system shown in FIG. 1.

DESCRIPTION OF THE PREFERRED EMBODIMENT

Referring to the drawings, conveyor assembly 10, of the type used for outdoor materials handling, is shown partially broken away and its belt 12 partially filled with a fluid 14, typically rain water. A fluid removal apparatus 16 in accordance with this invention is mounted to a support 18, for example, supporting conveyor 10 via axles 20 and rollers 22 and automatically removes fluid 14 from conveyor 10 when this fluid reaches a predetermined level.

Apparatus 16 includes a base assembly 24 having upright tubular supports 26 and 28, and it movably supports a siphon tube assembly 30. Base assembly 24 is mounted to support 18 of conveyor 10 by a pair (only one being shown) of mounting arms 32. In addition, base assembly 24 is supported by base members 34 and 36 on a structural base, not shown. These base members also cap or seal the bottom of tubular supports 26 and 28.

Siphon tube or pipe assembly 30 is constructed of glued sections of PVC, ABS, etc. It is generally configured as shown in FIGS. 1 and 2 and includes a siphon pipe 38 having as its right end 40 a large diameter suction opening 42 which is set from ¼" to ½" above belt 12 so as to draw water 14 from belt 12 when a selected level is sensed. Siphon pipe 38 extends upward through pipe section 44, L 46, then through horizontal section 48, through L 50, then through vertical section 52, and finally through L 54 and horizontal pipe section 56 to a desired drain point 60. A normally closed pressure operated valve 62 is positioned in section 64 near the drain point. Valve 62, illustrated in FIG. 3, typically would have a flap 66 and biasing spring 68, and biasing spring 68 would be such as to open flap 66 under a head pressure which is reached when siphon pipe 38 is full, with flap 66 thus resisting the hydrostatic pressure until the release pressure is reached.

An annular spray head 70 is mounted near inlet 42 of siphon pipe 38, and its function is to effect a spray which moves small debris away from inlet 42 as tube 38 is lowered into water 14 in belt 12. It is fed by a service tube 72. Service water to tube 72 is supplied water through connector 84, flexible tube 82, and pipe 80 from solenoid valve 74. It is a normally closed valve and is operated by normally open float switch 76 and serially connected, normally closed limit switch 78 through which A.C. power is supplied as illustrated in FIG. 4. Trunk line 80 also supplies water from connector 84 to the interior of siphon tube 38 and through tubes 136 and 138 to the interior of columns 26 and 28.

Siphon pipe assembly 30 is slidably supported on tubular supports 26 and 28 of base assembly 24, also constructed of glued sections of PVC, by upper and lower supports 88a and 88b. Upper support 88a is formed by a union 90a cemented to vertical section 52 of siphon pipe 38 and two T's 92 a and 94a which are machined to slide on supports 26 and 28 and are glued to both sides of union 90a. Lower support 88b is like top support 88a and components cover like designations with the suffixes "a" and "b."

Crossed cords 96 and 98 extend upward from T's 92a and 94a and into PVC pipe section 100 through opening 101. Cord 96 continues around pulley 102 in pipe section 100 and cord 98 around pulley 104 in pipe section 100. Cord 96 then continues to the left and cord 98 to the right. Cord 96 passes over pulley 106 supported by pipe L 108 and down through pipe section 110 of support 26 to counterweight 112.

Similarly, cord 98 passes over pulley 114 supported by pipe L 116 and then passes down through pipe section 118 of tubular support 28 to counterweight 120 (FIG. 1). In this manner, counterweights 112 and 120 provide a lifting effect to siphon pipe assembly 30. The pulleys are pivotally supported by their shafts in openings 112a, 112b, and 122c in the PVC pipe.

With no fluid (to reduce the effective weight of the counterweights) in tubular supports 26 and 28, weights 112 and 120 will assume the position shown, holding siphon tube assembly 30 in the elevated position (FIG. 1). This is the normal inoperative posture of the system.

Operation is initiated by float switch assembly 124. This assembly employs a float ball 126 on arm 128 and switch 76, and the assembly is mounted, by means not shown, to a position illustrated in FIGS. 1 and 2. When not in use, and optionally, float switch assembly may be pivoted by a hydraulic cylinder 130 upward and out of the way of material being conveyed on belt 12 by, for example, hydraulic cylinder 130 powered by means not shown. In such event, auxiliary means would be provided to remove power from float switch assembly 124.

Prior to the installation of base assembly 24, the elevation of siphon tube assembly 30, in its lower position, should be determined by selecting the distance at which suction inlet 42 would come to rest above belt 12 of conveyor assembly 10 when suction pipe assembly 30 is in its lowered position. Arms 32 (only one being shown) are then fixedly secured to support 18 so that when suction assembly 30 is lowered, the desired height of suction inlet 42 is achieved by virtue of T's 92b and 94b of siphon assembly 30 resting on the top edges of machined T's 134a and 134b which support base assembly 24 on arms 32.

To examine operation, under normal conditions wherein the water level on conveyor belt 12 is below the closing point of normally open float switch 76, siphon tube assembly 30 would be in a raised position, as shown in FIG. 1, and remain in this position until the level of fluid in conveyor belt 12 lifts float 126 to a predetermined level, thereby closing switch 76. Switch 76 then, through normally closed limit switch 78, energizes solenoid valve 74, allowing service water from hose 82 to flow into distribution tubes 136 and 138. Tubes 136 and 138 supply service water into hollow column supports 26 and 28, thereby submerbing counterweights 112 and 120, causing them to become "lighter" with respect to siphon tube assembly 30 which they counterbalance. Air from column supports 26 and 28 escapes from pulley cord opening 101. Simultaneously, tube 80 supplies service water into pipe 38 of siphon tube assembly 30 via hose 82 and orifice 86, causing it to fill with service water, thereby siphon tube assembly 30 becoming "heavier" than the effective weights (in water) of counterweights 112 and 120. This change in the balance between counterweights 112 and 120 and siphon tube assembly 30 results in the latter being lowered by gravity from its normally raised position via cords 96 and 98 and the pulleys. It moves downward until it bottoms out on T's 134a and 134b. In this manner, the mouth or opening 42 of siphon tube 38 is limited to a selected clearance with conveyor belt 12.

Service water also flows through line 72 and emerges as a spray from spray head 70, and this spray moves debris, which may block the downward movement of pipe 44, from around siphon opening 42. Service water continues to flow into and fill suction tube 38 through orifice 86 until it fills and the resulting pressure operates discharge valve 62 open. When valve 62 opens, the water in now filled siphon tube 38 rushes out discharge opening 60, creating a vacuum at suction inlet 42, thereby initiating a siphoning action to siphon fluid 14 from conveyor belt 12.

Simultaneously with the bottoming out of siphon tube assembly 30 and essentially simultaneous creation of the siphoning action, solenoid valve 74 is de-energized by limit switch 78 which is operated open by arm 79 on siphon tube assembly 30 when siphon tube assembly 30 reaches a selected lower excursion, thereby preventing additional water from entering tube 38 or columns 26 and 28 and shutting off the spray from spray head 70.

Fluid continues to be siphoned from conveyor belt 12 until the fluid level in belt 12 falls below suction opening 42, thus breaking the siphoning action. When this occurs the service water in columns 26 and 28 drains back through distribution tubes 136 and 138, into distribution tube 80 up through hose 82, out into the interior of tube 38 via orifice 86, and is discharged through still-open valve 62 and out opening 60. This draining action in columns 26 and 28 causes counterweights 112 and 120 to no longer be submerged, thereby becoming "heavier" with respect to drained siphon tube 38, causing siphon tube assembly 30 to be moved by gravity to its normally raised position via cords 96 and 98. While switch 78 would close, float switch 76 would open, preventing solenoid valve 74 from energizing at this time. Thus, the system would remain at rest until, again, typically due to rain, water would rise in conveyor belt 12, whereupon the drainage cycle would be repeated.

What is claimed is:

1. A conveyor dewatering system comprising:
   drain means having an inlet positionable to be submerged into a liquid in a conveyor belt and an outlet below said inlet and a tube connecting inlet and outlet, whereby, with said inlet submerged in liquid and upon the development of a full pipe, a siphon conditioon will be effected;
   support means for supporting said drain means at varying elevations;
   lowering means responsive to liquid rising to a selected level in a said conveyor belt for lowering said inlet into said liquid; and
   lift means coupled to said drain means and responsive to the liquid level in a conveyor belt falling below said inlet, and the termination of the siphon state, for lifting said inlet of said drain means.

2. A conveyor dewatering system as set forth in claim 1 wherein said lowering means includes a float switch coupled to monitor the liquid level in a conveyor belt.

3. A conveyor dewatering system as set forth in claim 2 wherein said lowering means comprises a generally vertical cavity, a source of service liquid, at least one weight positioned in said cavity, and coupling means for coupling said weight as a counterweight to support said drain means and valve means responsive to said float switch for coupling liquid from said source of service liquid to said cavity, whereby said drain means overcomes said weight and lowers into a conveyor belt.

4. A conveyor dewatering system as set forth in claim 3 further comprising coupling means coupled to said valve means for coupling liquid from said source of liquid to said tube, whereby said drain means is primed and is made heavier, aiding the lowering of said inlet of said drain means into a said conveyor belt.

5. A conveyor dewatering system as set forth in claim 4 wherein said drain means includes a pressure operated valve coupled to said drain means and proximate to said outlet for opening said outlet responsive to a selected head of level in said drain means and thereby initiating siphon of fluid from said conveyor belt through said drain means.

6. A conveyor dewatering system as set forth in claim 5 wherein said system includes control means responsive to said drain means being moved to a selected lower level position for turning off said source of service liquid to said cavity.

7. A conveyor dewatering system as set forth in claim 6 wherein said control means includes switching means responsive to said drain means being moved to said selected lower level position for operating said valve means to a closed state.

* * * * *